United States Patent
He et al.

(10) Patent No.: US 12,388,641 B2
(45) Date of Patent: Aug. 12, 2025

(54) DATA PROCESSING METHOD AND APPARATUS, COMPUTER DEVICE AND COMPUTER STORAGE MEDIUM

(71) Applicant: BEIJING BYTEDANCE NETWORK TECHNOLOGY CO., LTD., Beijing (CN)

(72) Inventors: Peixuan He, Beijing (CN); Baozeng Ding, Beijing (CN); Quanwei Cai, Beijing (CN); Ye Wu, Beijing (CN); Wei Feng, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 194 days.

(21) Appl. No.: 18/256,275

(22) PCT Filed: Jan. 25, 2022

(86) PCT No.: PCT/CN2022/073738
§ 371 (c)(1),
(2) Date: Jun. 7, 2023

(87) PCT Pub. No.: WO2022/170967
PCT Pub. Date: Aug. 18, 2022

(65) Prior Publication Data
US 2024/0031150 A1    Jan. 25, 2024

(30) Foreign Application Priority Data
Feb. 9, 2021    (CN) .......................... 202110179406.0

(51) Int. Cl.
H04L 29/06    (2006.01)
G06F 21/00    (2013.01)
H04L 9/08    (2006.01)
H04L 9/30    (2006.01)
H04L 9/32    (2006.01)

(52) U.S. Cl.
CPC .......... *H04L 9/3066* (2013.01); *H04L 9/0869* (2013.01); *H04L 9/3257* (2013.01)

(58) Field of Classification Search
CPC ... H04L 9/3066; H04L 9/0869; H04L 9/3257; H04L 2209/08; H04L 9/3073;
(Continued)

(56) References Cited

U.S. PATENT DOCUMENTS

2009/0112629 A1* 4/2009 Leiper ............... G16H 10/60
705/3
2012/0278609 A1* 11/2012 Camenisch .......... H04L 9/3013
713/150
(Continued)

FOREIGN PATENT DOCUMENTS

| CN | 103107890 A | 5/2013 |
|----|-------------|--------|
| CN | 103765456 A | 4/2014 |

(Continued)

OTHER PUBLICATIONS

China National Intellectual Property Administration, Notification to Grant Patent Right for Invention Issued in Application No. 202110179406.0, Oct. 25, 2022, 8 pages.

(Continued)

*Primary Examiner* — Lisa C Lewis
(74) *Attorney, Agent, or Firm* — Alleman Hall & Tuttle LLP

(57) ABSTRACT

The present disclosure provides a data processing method and apparatus, a computer device and a computer storage medium, wherein the method includes: performing blinding processing on target information to be transmitted to obtain blinded information; acquiring a plurality of pieces of first encryption information obtained by respectively performing encryption processing on the blinded information by a plurality of service participation ends; performing data
(Continued)

fusion on the plurality of pieces of first encryption information to obtain second encryption information; and performing de-blinding processing on the second encryption information to obtain third encryption information as a ciphertext identification corresponding to the target information.

20 Claims, 2 Drawing Sheets

(58) Field of Classification Search
CPC .............. H04L 2209/46; H04L 63/0428; H04L 9/0643; H04L 63/08; H04L 2209/60
See application file for complete search history.

(56) References Cited

U.S. PATENT DOCUMENTS

| | | |
|---|---|---|
| 2012/0323998 A1 | 12/2012 | Schoen et al. |
| 2014/0304519 A1* | 10/2014 | Gorecki ................ H04L 9/0825 713/176 |
| 2017/0104726 A1* | 4/2017 | Camenisch ......... H04L 63/0428 |
| 2017/0169425 A1* | 6/2017 | Metral ................ G06F 21/6209 |
| 2019/0327088 A1 | 10/2019 | Camenisch et al. |
| 2022/0353251 A1* | 11/2022 | Wang ...................... G06F 21/40 |

FOREIGN PATENT DOCUMENTS

| | | |
|---|---|---|
| CN | 110636070 A | 12/2019 |
| CN | 110830414 A | 2/2020 |
| CN | 112953931 A | 6/2021 |

OTHER PUBLICATIONS

ISA China National Intellectual Property Administration, International Search Report and Written Opinion Issued in Application No. PCT/CN2022/073738, Mar. 23, 2022, WIPO, 19 pages.

China National Intellectual Property Administration, Office Action and Search Report Issued in Application No. 202110179406.0, Jul. 13, 2022, 13 pages.

\* cited by examiner

DATA PROCESSING METHOD AND APPARATUS, COMPUTER DEVICE AND COMPUTER STORAGE MEDIUM

CROSS-REFERENCE TO RELATED APPLICATIONS

This application is a U.S. National Stage under 35 U.S.C. § 371 of International Application No. PCT/CN2022/073738, as filed on Jan. 25, 2022, which is based on and claims the priority to the Chinese patent application No. 202110179406.0 entitled "DATA PROCESSING METHOD AND APPARATUS, COMPUTER DEVICE AND COMPUTER STORAGE MEDIUM" and filed on Feb. 9, 2021. The disclosure of each of these applications is incorporated herein by reference in its entirety.

TECHNICAL FIELD

The present disclosure relates to the technical field of information security, and in particular, to a data processing method and apparatus, a computer device and a computer storage medium.

BACKGROUND

When interaction is performed between different platforms, transmission of some confidential data is involved. In order to protect security of the confidential data, some platforms generally perform hash operation on the confidential data and then send the hash operation result to the other platforms to replace the confidential data.

For example, in an advertisement launch service, in order to better decide an advertisement launch strategy, it is generally required to send a device identity (DID) of a user stored on a media end to a plurality of demand-side platforms (DSPs), and then the DSPs determine a corresponding bidding strategy based on these DIDs. In this process, if the media end sends the plaintext DID or hash values of the DID to the DSP, leakage of the confidential data such as DID will be caused.

Therefore, how to improve the security of the confidential data on a premise of satisfying use of the confidential data is a problem to be solved.

SUMMARY

An embodiment of the present disclosure at least provides a data processing method and apparatus, a computer device and a computer storage medium.

In a first aspect, an embodiment of the present disclosure provides a data processing method, comprising:
  performing blinding processing on target information to be transmitted to obtain blinded information;
  acquiring a plurality of pieces of first encryption information obtained by respectively performing encryption processing on the blinded information by a plurality of service participation ends;
  performing data fusion on the plurality of pieces of first encryption information to obtain second encryption information;
  performing de-blinding processing on the second encryption information to obtain third encryption information as a ciphertext identification corresponding to the target information, wherein the ciphertext identification corresponding to the target information is used for replacing the target information to be used in a service in which the plurality of service participation ends jointly participate.

In an optional implementation, the performing blinding processing on target information to be transmitted to obtain blinded information comprises:
  performing hash processing on the target information to be transmitted to obtain hash values;
  selecting a target random number, and performing blinding processing on the hash values based on a blinding coefficient corresponding to the target random number to obtain the blinded information;
  and correspondingly, the performing de-blinding processing on the second encryption information to obtain third encryption information comprises:
  determining a de-blinding coefficient corresponding to the target random number, and performing de-blinding processing on the second encryption information in accordance with the de-blinding coefficient to obtain the third encryption information.

In an optional implementation, the performing data fusion on the plurality of pieces of first encryption information to obtain second encryption information comprises:
  performing a multiplication operation on the plurality of pieces of first encryption information, and using a result of the multiplication operation as the second encryption information; or,
  performing a division operation on the plurality of pieces of first encryption information to obtain a result, and using the result of the division operation as the second encryption information.

In an optional implementation, the method further comprises:
  performing legality verification on the third encryption information, wherein the legality verification is used for verifying whether there is illegal first encryption information in the plurality of pieces of first encryption information provided by the plurality of service participation ends;
  when the third encryption information does not satisfy legality, determining an illegal target service participation end from the plurality of service participation ends;
  performing data re-fusion based on first encryption information generated by other service participation ends than the target service participation end to generate second encryption information, and updating the ciphertext identification corresponding to the target information based on re-synthesized second encryption information; or, sending a ciphertext correction instruction to the target service participation end, acquiring updated first encryption information returned by the target service participation end in response to the ciphertext correction instruction, and updating the ciphertext identification corresponding to the target information based on the updated first encryption information.

In an optional implementation, the method further comprises:
  sending a multimedia resource launch strategy request to a demand-side platform, the multimedia resource launch strategy request comprising the ciphertext identification corresponding to the target information;
  receiving a target multimedia resource launch strategy returned by the demand-side platform, the target multimedia resource launch strategy being a launch strategy determined by the demand-side platform based on the ciphertext identification corresponding to the target information; and performing multimedia resource launch in accordance with the target multimedia resource launch strategy.

In an optional implementation, the method further comprises:

when there is a newly added service participation end, sending the target information to the newly added service participation end, and updating the ciphertext identification corresponding to the target information in accordance with first encryption information returned by the newly added service participation end.

In an optional implementation, the method further comprises:

when there is a service participation end applying for exit, performing identity legality verification on the service participation end applying for exit, and when legality is verified, updating the ciphertext identification corresponding to the target information based on a private key provided by the service participation end applying for exit.

In a second aspect, an embodiment of the present disclosure provides a data processing apparatus, comprising:

a first processing module configured to perform blinding processing on target information to be transmitted to obtain blinded information;

an acquisition module configured to acquire a plurality of pieces of first encryption information obtained by respectively performing encryption processing on the blinded information by a plurality of service participation ends;

a fusion module configured to perform data fusion on the plurality of pieces of first encryption information to obtain second encryption information;

a second processing module configured to perform de-blinding processing on the second encryption information to obtain third encryption information as a ciphertext identification corresponding to the target information, wherein the ciphertext identification corresponding to the target information is used for replacing the target information to be used in a service in which the plurality of service participation ends jointly participate.

In a third aspect, an optional implementation of the present disclosure further provides a computer device, comprising a processor and a storage, the storage having stored thereon machine-readable instructions executable by the processor, the processor being configured to execute the machine-readable instructions stored in the storage which, when executed by the processor, perform the steps of the method in the first aspect described above, or the steps of the method in any of the possible implementations in the first aspect.

In a fourth aspect, an optional implementation of the present disclosure further provides a non-transitory computer-readable storage medium having stored thereon a computer program which, when executed, performs the steps of the method in the first aspect described above, or the steps of the method in any of the possible implementations in the first aspect.

In a fifth aspect, an optional implementation of the present disclosure further provides a computer program which, when executed by a computer device, performs the steps of the method in the first aspect described above, or the steps of the method in any of the possible implementations in the first aspect.

In a sixth aspect, an optional implementation of the present disclosure further provides a computer program product having stored thereon a computer program which, when executed by a computer device, performs the steps of the method in the first aspect, or the steps of the method in any of the possible implementations in the first aspect.

According to the data processing method and apparatus, the computer device and the computer storage medium provided by the embodiments of the present application, blinding processing is performed on target information to be transmitted to obtain blinded information; a plurality of pieces of first encryption information obtained by respectively performing encryption processing on the blinded information by a plurality of service participation ends are acquired; data fusion is performed on the plurality of pieces of first encryption information to obtain second encryption information; de-blinding processing is performed on the second encryption information to obtain third encryption information as a ciphertext identification corresponding to the target information, wherein the ciphertext identification corresponding to the target information is used for replacing the target information to be used in a service in which the plurality of service participation ends jointly participate. The target information here is blinded and then sent to the plurality of service participation ends for encryption, and the final ciphertext identification corresponding to the target information is a fusion result of joint encryption by the plurality of service participation ends, so that security of the ciphertext identification is improved.

In an advertisement launch service, the above-mentioned service participation end can be a media end, which can be understood as a platform (client and/or server) for providing media content; the data processing method provided by the present application can be applied to the media end and can also be applied to a demand-side platform participating in the advertisement launch; with the above solution, in an advertisement launch system in which a plurality of media ends and a demand-side platform participate, the device identity (DID) of a user is subjected to blinding first, then a final DID ciphertext identification is generated based on joint participation in encryption by the plurality of media ends, and in a final advertisement launch application, by using the DID ciphertext identification in place of the DID plaintext for transmission, the demand-side platform (DSP) completes a decision of an advertisement launch strategy based on the DID ciphertext identification, so that plaintext leakage of the confidential DID can be avoided, and security of the confidential data is improved while the normal service is guaranteed.

To further clarify the above objectives, features and advantages of the present disclosure, exemplary embodiments are provided hereinafter, and the detailed description thereof is made in combination with the accompanying drawings.

BRIEF DESCRIPTION OF THE DRAWINGS

In order to more clearly illustrate the technical solutions of the embodiments of the present disclosure, the accompanying drawings that need to be used in the embodiments will be briefly described below; the drawings herein are incorporated in and form a part of the description; these drawings illustrate embodiments consistent with the present disclosure and, together with the description, serve to explain the technical solutions of the present disclosure. It should be understood that the following drawings illustrate merely certain embodiments of the present disclosure, so that they

DETAILED DESCRIPTION

To make the objectives, technical solutions and advantages of the embodiments of the present disclosure clearer, the technical solutions in the embodiments of the present disclosure will be described clearly and completely in conjunction with the drawings in the embodiments of the present disclosure, and it is apparent that the described embodiments are merely part of the embodiments of the present disclosure, rather than all of the embodiments. Components of the embodiments of the present disclosure, which are generally described and illustrated herein, can be arranged and designed in a wide variety of different configurations. Therefore, the following detailed description of the embodiments of the present disclosure is not intended to limit the claimed scope of the present disclosure, but merely indicates selected embodiments of the present disclosure. All other embodiments, which are obtained by those skilled in the art based on the embodiments of the present disclosure without making any creative effort, shall fall within the protection scope of the present disclosure.

In view of the need for confidential-data protection when interaction is performed between platforms, the solutions of the embodiments of the present disclosure are provided.

Figure 1:
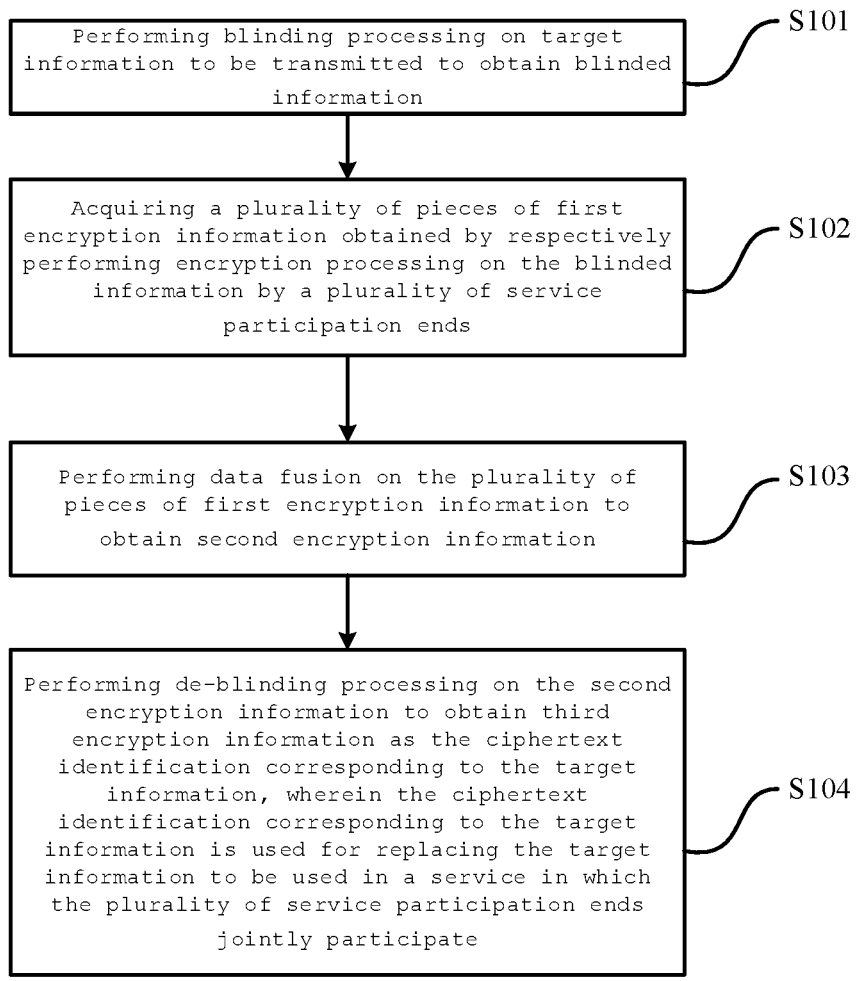
FIG. 1 shows a flow diagram of a data processing method provided by an embodiment of the present disclosure.

Referring to FIG. 1, a flow diagram of a data processing method provided by an embodiment of the present disclosure is shown. A subject for executing the data processing method can be any media end, or a demand-side platform (DSP) (for convenience of description, collectively referred to as an encryption initiating end anywhere unified description is involved hereinafter); in addition, service participation ends participating in joint encryption are a plurality of media ends. The method comprises steps S101 to S104, in which:

S101, performing blinding processing on target information to be transmitted to obtain blinded information.

The target information to be transmitted is generally confidential information, such as a device identity (DID) of a user device, or an international mobile equipment identity (IMEI) of a user device, or a universally unique identifier (UDID) of a user device, or the like.

In a practical application, these confidential information is generally used for uniquely identifying some basic information of a user, for example, based on the device identity (DID), user persona data is established and maintained, for example, a correspondence between the DID and the user persona data may be stored, so that once the DID is leaked, the user persona data is easily learned from such a correspondence, and some qualitative analysis can be further performed, which results in information leakage of more dimensions or business influences. Therefore, in a practical application, it is more desired to use the device identity (DID) as the confidential information, but it is not wished to leak the information out.

It should be noted that, in the embodiment of the present disclosure, multiparty encryption is implemented based on an elliptic curve in cryptography, wherein a bilinear group involved in the embodiment of the present disclosure is a prime-order bilinear group, which can be described by a quintuple (p, $G_1$, $G_2$, $G_T$, e), where p is one big prime number correlated with a given security coefficient $\lambda$; $G_1$, $G_2$, $G_T$ are three multiplicative cyclic groups with the same prime-order p; e characterizes a bilinear mapping function, generally denoted as e(•,•); and in the prime-order bilinear group, there are also a generator $g_1$ corresponding to $G_1$ and a generator $g_2$ corresponding to $G_2$.

The prime-order bilinear group here satisfies bilinear mapping: i.e. for all a, $b \in Z_p$ and $V \in G_1$, $u \in G_2$, $e(v^a, u^b) = e(v,u)^{ab}$ can be obtained, where $Z_p$ is used for characterizing prime number sets in integers; the prime-order bilinear group also satisfies computability: i.e., being provided with an efficient algorithm for calculating the bilinear mapping; and the prime-order bilinear group also satisfies non-degeneracy: i.e. $e(g_1, g_2) \neq 1$.

The multiplicative cyclic groups $G_1$, $G_2$ in the bilinear mapping here can be the same or different; the multiplicative cyclic group can be a symmetric bilinear group or an asymmetric bilinear group; and since security of the asymmetric bilinear group is higher than that of the symmetric bilinear group, in the embodiment of the present disclosure, the data processing method is described in detail by taking an example that the multiparty encryption is implemented using a bilinear mapping method of the asymmetric bilinear group.

In a service of multiparty participation, in order to ensure privacy of the target information, the blinding processing on the target information is performed first, and a specific blinding processing method comprises:

obtaining hash values by performing hash processing on the target information to be transmitted; and selecting a target random number and performing blinding processing on the hash values based on a blinding coefficient corresponding to the target random number to obtain the blinded information.

Here, taking an example that the target information to be transmitted is DID, in order to convert the DID into an element on the bilinear group, a hash function $H_G(•) = \{0, 1\}^* \to G_1$ that converts DID of any length into an element on the multiplicative cyclic group $G_1$ is thus used, where $\{0,1\}^*$ is used for representing the DID of any length; and hash values obtained after hash processing on the DID through the hash function $H_G(•)$ is characterized by $H_G(DID)$.

Here, the selected target random number is characterized by $\beta$, the target random number being a prime number randomly selected for the DID, where $\beta \in Z_p$; and a blinding coefficient corresponding to the target random number is determined based on that the target random number $\beta$ is used as a power exponent of the generator $g_1$ of the multiplicative cyclic group $G_1$, that is, the blinding coefficient corresponding to the target random number is $g_1^\beta$.

Here, through the hash function $H_G(•)$, the DID of any length is converted into DID of a fixed length on the multiplicative cyclic group $G_1$ to obtain the hash values $H_G(DID)$; after the hash values corresponding to the DID are obtained, the hash values can be multiplied by the blinding coefficient $g_1^\beta$ to obtain the blinded information after the blinding processing.

Specifically, the blinded information after the blinding processing on the hash values corresponding to the DID can be characterized by M, and a specific blinding processing formula can be as shown in formula (1):

$$M = H_G(\text{DID}) \cdot g_1^\beta \quad \text{formula (1)}$$

where M characterizes the blinded information; $g_1^\beta$ characterizes the blinding coefficient; $\beta$ characterizes the target random number; and $g_1$ characterizes the generator of the multiplicative cyclic group $G_1$.

In a specific implementation, after the blinding processing on the target information to be transmitted is performed based on the step S101, to obtain the blinded information after the blinding processing, a ciphertext identification corresponding to the target information to be transmitted can be generated based on the following steps S102 to S104, which are specifically described as follows.

S102, acquiring a plurality of pieces of first encryption information obtained by respectively performing encryption processing on the blinded information by a plurality of service participation ends.

Here, the plurality of service participation ends refer to ends that need to participate in one service system, for example, in an advertisement service system, they can be a plurality of media ends, which can be understood as service ends capable of carrying an advertisement service, for example, an information recommendation application, a game application, a video application, and the like.

In a specific implementation, encryption processing on the blinded information is performed using a multiparty encryption method, so that the blinded information obtained based on the step S101 can be sent to the plurality of service participation ends, and each service participation end, after receiving the blinded information, can perform encryption processing on the blinded information through its own private key to obtain encrypted first encryption information.

In order to ensure that the target information to be transmitted can be transmitted in an encryption form and can be uniquely identified without repetition in the service of joint participation, the plurality of service participation ends jointly participate in the encryption processing. An example that a plurality of service participation ends are a plurality of media ends in an advertisement launch service is taken for the following description.

Each media end maintains its own private key, which can be characterized by $\alpha_i$, where i is used for characterizing a serial number of the media end; and each media end also correspondingly has its own public key, which is generally published; here, since the multiparty encryption is implemented in the embodiment of the present disclosure by means of the elliptic curve method, each media end correspondingly has public keys respectively corresponding to the two multiplicative cyclic groups, that is, each media end correspondingly has a public key $PK_i = g_1^{\alpha_i}$ on the group $G_1$, and a public key $PK'_i = g_2^{\alpha_i}$ on the group $G_2$; and here, the public key on the group $G_1$ and the public key on the group $G_2$ can be determined through the private key of each media end and the generator $g_1$ of the group $G_1$, and the generator $g_2$ of the group $G_2$.

In cryptography, a power in an exponent power generally cannot be derived according to a result of the exponent power; and therefore, although the public key $PK_i = g_1^{\alpha_i}$ on the group $G_1$ and the public key $PK'_i = g_2^{\alpha_i}$ on the group $G_2$ corresponding to each media end are published, the private key corresponding to each media end cannot be calculated.

Specifically, each service participation end, through its own private key $\alpha_i$, performs encryption processing on the blinded information (i.e., M) after the blinding processing (i.e., uses M as a base number, and uses the private key $\alpha_i$ of each service participation end as a power exponent), to obtain the encrypted first encryption information $c_i$.

Specifically, a formula for performing encryption processing on the blinded information after the blinding processing by an i th service participation end can be as shown in formula (2):

$$c_i = M^{\alpha_i} \quad \text{formula (2)}$$

where $c_i$ characterizes first encryption information generated by an ith service participation end; $\alpha_i$ characterizes a private key of the ith service participation end; and M characterizes the blinded information after the blinding processing.

In a specific implementation, if an encryption initiating end, for example, a first service participation end, respectively sends an encryption request including blinded information to other service participation ends in the system, the so-called other plurality of service participation ends respectively independently perform encryption processing on the blinded information to obtain respectively processed first encryption information, and feed it back to the first service participation end, and at the same time, the first service participation end itself also performs encryption processing on the blinded information to obtain corresponding first encryption information, so that the plurality of pieces of first encryption information obtained by performing encryption processing on the blinded information by all the service participation ends in the system are acquired.

In a practical application, in an existing demand-side platform (DSP), historically maintained DID plaintext and related advertisement bidding information may be stored to provide an advertisement launch service for an advertiser; based on this, in order to be compatible with the working principle of the existing demand-side platform (DSP), the DSP can first perform blinding processing on the historically maintained DID plaintext, and then send the encryption request to all service participation ends, i.e., all media ends participating in the service, to acquire first encrypted information returned by all the media ends.

In an application of the solution of the present application, when a new DID is generated, a media end can actively perform blinding processing, and while performing encryption locally, it will also request other media ends to participate in the encryption, so that a plurality of pieces of first encryption information obtained by all media ends performing encryption on blinded information are obtained finally.

S103, performing data fusion on the plurality of pieces of first encryption information to obtain second encryption information.

In a specific implementation, a multiplication operation can be performed on the plurality of pieces of first encryption information, and the result of the multiplication operation is used as the second encryption information; or, a division operation is performed on the plurality of pieces of first encryption information to obtain an operation result, and the result of the division operation is used as the second encryption information.

It should be noted that the plurality of pieces of first encryption information refers to encryption information obtained by respectively performing encryption processing on the blinded information by all the service participation ends participating in the service. For example, in an advertisement launch service, there are five media ends for participation, when one of the media ends needs to transmit a certain device identity (DID), the media end blinds the DID first, then the media end encrypts the blinded information by itself to obtain first encryption information, and at the same time, the media end also needs to acquire first encryption information obtained by respectively performing encryption processing on the blinded information by the other four media ends, and finally, the first encryption information respectively processed by the five media ends, which are five pieces of first encryption information in total, will be obtained.

When the DSP needs to encrypts the device identity (DID), still taking five media ends as an example, the DSP blinds the DID to obtain blinded information, then requests the five media ends to jointly participate in encryption, and finally obtain first encryption information obtained by respectively performing encryption processing on the blinded information by the five media ends.

In a specific implementation, the media ends all need to encrypt the blinded information with their respective private keys, and a specific encryption method can be exemplified by an encryption process of a first media end described below, wherein the first media end here is any media end that needs protection for DID.

The first media end performs encryption processing on the blinded information after the blinding processing through its own private key $\alpha_{self}$ to obtain first encryption information $c_{self}$ encrypted by the first media end; and a specific encryption formula is as shown in the following formula (3):

$$c_{self} = M^{\alpha_{self}} \qquad \text{formula (3)}$$

where M characterizes the blinded information after the blinding processing.

A target operation here can include at least one of a multiplication operation and a division operation, and it should be noted here that the target operation is the same as an operation of formula (6) and formula (7) in step S104 below when a system public key is calculated, and the target operation is the same as an operation of formula (12) in step S104 below when correctness verification is performed; and in the embodiment of the present disclosure, the multiplication operation is taken as an example for detailed description.

Specifically, fused second encryption information is obtained by performing the multiplication operation on the plurality of pieces of first encryption information obtained by the respective encryption processing by the plurality of service participation ends, which is as shown in the following formula (4):

$$\Pi_{i \in \{1,2,\ldots,n\} \setminus self} c_i \cdot c_{self} \qquad \text{formula (4)}$$

where $\Pi$ represents a continuous multiplication calculation (all the $\Pi$ hereinafter represents the continuous multiplication calculation, which is not described again); i represents an ith service participation end; n represents the number of the service participation ends; $i \in \{1, 2, \ldots, n\} \setminus$ self is used for characterizing other n service participation ends than the first media end which initiates an encryption request; $c_i$ represents first encryption information after encrypting the blinded information by the ith service participation end; and $c_{self}$ represents first encryption information after encrypting the blinded information by the service participation end itself which initiates the encryption request.

The target operation here can include at least one of the multiplication operation and the division operation, and it should be noted here that the target operation is the same as an operation of formula (6) and formula (7) in step S104 below when a system public key is calculated, and the target operation is the same as an operation of formula (12) in step S104 below when correctness verification is performed; and in the embodiment of the present disclosure, the multiplication operation is taken as an example for detailed description.

Specifically, a formula for obtaining fused second encryption information by performing the multiplication operation on the first encryption information respectively encrypted by the plurality of service participation ends can be as shown in the following formula (5):

$$\Pi_{i \in \{1,2,\ldots,n\}} c_i \qquad \text{formula (5)}$$

where i represents an ith service participation end; n represents the number of service participation ends; $i \in \{1, 2, \ldots, n\}$ characterizes from a 1st service participation end to an nth service participation end; and $c_i$ represents first encryption information obtained after encrypting the blinded information by the ith service participation end.

In a specific implementation, since the blinded information includes the target random number, in order to eliminate an influence of the target random number, it is necessary to perform de-blinding processing on the fused second encryption information to obtain the ciphertext identification corresponding to the DID to be transmitted.

S104, performing de-blinding processing on the second encryption information to obtain third encryption information as the ciphertext identification corresponding to the target information, wherein the ciphertext identification corresponding to the target information is used for replacing the target information to be used in a service in which the plurality of service participation ends jointly participate.

Since the blinded information after the blinding process here includes the target random number and the fused second encryption information is a result of multiplication of the plurality of pieces of first encryption information, by using the above system public keys generated by respective public keys of the plurality of service participation ends, a de-blinding coefficient can be determined first, and then de-blinding processing on the second encryption information can be performed by using the de-blinding coefficient to eliminate the influence of the target random number.

In a specific implementation, in the embodiment of the present disclosure, multiparty joint encryption can be implemented by the plurality of service participation ends by means of the elliptic curve method, thus the above plurality of service participation ends all correspondingly have the system public keys respectively corresponding to the two multiplicative cyclic groups, the system public keys including a first system public key PK on the group $G_1$ and a second system public key PK' on the group $G_2$; here, the first system public key on the group $G_1$ can be calculated through the public keys on the group $G_1$ respectively corresponding to the plurality of service participation ends, and a calculation formula is as shown in the following formula (6):

$$PK = \Pi_{i \in \{1,2,\ldots,n\}} PK_i = g_1^{\alpha} \qquad \text{formula (6)}$$

where PK represents the first system public key on the group $G_1$ corresponding to the plurality of service participation ends; $PK_i$ represents the public key on the group $G_1$ corresponding to the ith service participation end; $g_1$ characterizes the generator corresponding to the group $G_1$; $\alpha$ characterizes a value of a sum of the private keys corresponding to the respective service participation ends, i.e., $\alpha=\Sigma_{i\in\{1, 2, \ldots, n\}}\alpha_i$); and $\alpha_i$ characterizes the private key corresponding to the ith service participation end.

Here, the second system public key on the group $G_2$ can be calculated through the public keys on the group $G_2$ respectively corresponding to the plurality of service participation ends, and a calculation formula is as shown in the following formula (7):

$$PK'\cdot\Pi_{i\in\{1,2,\ldots,\}}PK'_i=g_2{}^\alpha \qquad \text{formula (7)}$$

where PK' represents the second system public key on the group $G_2$ corresponding to the plurality of service participation ends; $PK'_i$ represents the public key on the group $G_2$ corresponding to the ith service participation end; and $g_2$ characterizes the generator corresponding to the group $G_2$.

In the embodiment of the present disclosure, since the target information to be transmitted is converted into an element on the group $G_1$ during the blinding processing described above, the de-blinding coefficient corresponding to the target random number can be generated by using the first system public key on the group $G_1$ corresponding to the plurality of service participation ends during the de-blinding processing; the de-blinding coefficient here can be characterized by a-βth power of the system public key on the group $G_1$, that is, $PK^{-\beta}$, and a specific formula for the de-blinding coefficient can be as shown in the following formula (8):

$$PK^{-\beta}=(\Pi_{i\in\{1,2,\ldots n\}}PK_i)^{-\beta}=g_1{}^{-\alpha\beta} \qquad \text{formula (8)}$$

where $PK^{-\beta}$ characterizes the de-blinding coefficient, $PK_i$ characterizes the public key corresponding to the ith service participation end; and $g_1$ characterizes the generator corresponding to the group $G_1$.

In a specific implementation, after the de-blinding coefficient corresponding to the target random number is determined, de-blinding processing can be performed on the second encryption information in accordance with the de-blinding coefficient to obtain third encryption information, and the third encryption information is used as the ciphertext identification corresponding to the target information.

Specifically, the de-blinding coefficient corresponding to the target random number determined above is multiplied by the fused second encryption information determined in the step S103 to obtain third encryption information after the de-blinding processing, and the third encryption information is used as the ciphertext identification corresponding to the target information.

Here, the third encryption information (i.e. the ciphertext identification corresponding to the target information) can be characterized by Cipher(DID); and specifically, a formula for performing de-blinding processing on the second encryption information to obtain the ciphertext identification Cipher(DID) corresponding to the target information can be as shown in the following formula (9) or formula (10):

$$Cipher(DID)=\Pi_{i\in\{1,2,\ldots n\}\backslash self}c_i\cdot c_{self'}PK^{-\beta}=[H_G(DID)\cdot g_1{}^\beta]^\alpha\cdot g_1{}^{-\alpha\beta}=H_G(DID)^\alpha \qquad \text{formula (9)}$$

$$Cipher(DID)=\Pi_{i\in\{1,2,\ldots n\}}c_i\cdot PK^{-\beta}=[H_G(DID)\cdot g_1{}^\beta]^\alpha\cdot g_1{}^{-\alpha\beta}=H_G(DID)^\alpha \qquad \text{formula (10)}$$

where the formula (9) characterizes: when the encryption initiating end comprises the first media end different from the service participation ends, performing de-blinding processing on the fused second encryption information by using the de-blinding coefficient $PK^{-\beta}$ to obtain the ciphertext identification Cipher(DID) corresponding to the target information; and the formula (10) characterizes: when the encryption initiating end comprises the DSP, performing de-blinding processing on the fused second encryption information by using the de-blinding coefficient $PK^{-\beta}$ to obtain the ciphertext identification Cipher(DID) corresponding to the target information.

In a specific implementation, after the ciphertext identification corresponding to the target information to be transmitted is generated based on the foregoing steps S101 to S104, legality verification can be performed on the third encryption information through a bilinear mapping function, which is specifically described as follows: performing legality verification on the third encryption information.

The legality verification here is used for verifying whether there is illegal first encryption information in the plurality of pieces of first encryption information provided by the plurality of service participation ends.

Specifically, correctness verification can be performed on the third encryption information based on the bilinear mapping function, a target system public key, and the hash values, to determine whether the third encryption information is legal.

Specifically, a formula for performing legality verification on the third encryption information can be as shown in the following formula (11):

$$e(Cipher(DID),g_2)=e(H_G(DID),PK') \qquad \text{formula (11)}$$

where $e(\cdot,\cdot)$ characterizes the bilinear mapping function; Cipher(DID) characterizes the third encryption information (i.e., the ciphertext identification corresponding to the target information); $g_2$ characterizes the generator corresponding to the group $G_2$; $H_G(DID)$ characterizes the hash values; PK' characterizes the second system public key (i.e., the target system public key) on the multiplicative cyclic group $G_2$ corresponding to the plurality of service participation ends; it should be noted here that, since the embodiment of the present disclosure is to convert the DID to be transmitted into the element on the multiplicative cyclic group $G_1$, during the legality verification, the second system public key PK' on the multiplicative cyclic group $G_2$ and the generator $g_2$ corresponding to the group $G_2$ need to be used; as an optional implementation, the DID to be transmitted can also be converted into the element on the multiplicative cyclic group $G_2$, and during the legality verification, the first system public key PK on the multiplicative cyclic group $G_1$ and the generator $g_1$ corresponding to the group $G_1$ are used.

Here, when the formula (11) is established, it is characterized that the third encryption information is legal, then the third encryption information can be used as the ciphertext identification corresponding to the target information to be transmitted.

Here, when the formula (11) is not established, it is characterized that the third DID ciphertext is illegal, then an illegal target service participation end are to be determined from the plurality of service participation ends.

The target service participation end is a media end which has a motive of affecting other service participation ends from normally performing the advertisement launch.

Specifically, the correctness verification can be performed on the first encryption information fed back by each service participation end based on the bilinear mapping function, the public key and the hash values respectively corresponding to each service participation end, to determine the target service participation end with ciphertext fraud from the plurality of service participation ends.

Specifically, a formula for performing correctness verification on the first encryption information fed back by each service participation end can be as shown in the following formula (12):

$$e(c_j \cdot PK_j^{-\beta}, g_2) = e(H_G(DID), PK'_j) \quad \text{formula (12)}$$

where $e(\cdot,\cdot)$ characterizes the bilinear mapping function; $c_j$ characterizes first encryption information after encrypting the blinded information after the blinding processing by a jth service participation end; $PK_j^{-\beta}$ characterizes a $-\beta$th power of a public key corresponding to the jth service participation end; $g_2$ characterizes the generator corresponding to the multiplicative cyclic group $G_2$; $H_G(DID)$ characterizes the hash values; $PK'_j$ characterizes the public key on the multiplicative cyclic group $G_2$ corresponding to the jth service participation end; here, $j \in \{1, 2, \ldots, n\}$, where n represents the number of the service participation ends.

In a specific implementation, the correctness verification can be performed on the first encryption information fed back by each service participation end in accordance with the formula (12), and when the formula (12) is established, it is characterized that the first encryption information fed back by the service participation end is correct; and when the formula (12) is not established, it is characterized that the first encryption information fed back by the service participation end is incorrect, then the service participation end for which the formula (12) is not established is determined as the target service participation end with ciphertext fraud.

In a specific implementation, after the target service participation end with ciphertext fraud is determined, the target service participation end can be kicked out from an encryption system (the encryption system includes a plurality of encryption participation ends participating in encryption, that is, the encryption system includes the plurality of service participation ends), and then based on first encryption information fed back by service participation ends other than the target service participation end, re-fusion is performed based on the above step S103 to generate fused second encryption information, and then, de-blinding processing is performed on re-synthesized second encryption information based on the above step S104 to obtain updated third encryption information, and the updated third encryption information is taken as the ciphertext identification corresponding to the target information;

or, a ciphertext correction instruction can be sent to the target service participation end to instruct the target service participation end to perform re-encryption on the received blinded information after the blinding processing in accordance with its own private key, to obtain updated first encryption information and send the updated first encryption information, so that the encryption initiating end can, based on the steps S102 to S104, acquire updated first encryption information returned by the target service participation end in response to the ciphertext correction instruction, perform fusion on the updated first encryption information and the received plurality of pieces of the first encryption information to obtain updated second encryption information, and then perform de-blinding processing on the updated second encryption information to obtain updated third encryption information, and use the updated third encryption information as the ciphertext identification corresponding to the target information; and then perform the above legality verification on the updated third encryption information.

In a possible implementation, when there are a plurality of pieces of target information to be transmitted, the third encryption information respectively corresponding to the plurality of pieces of target information to be transmitted can be generated at the same time, so that the legality verification can be performed on the plurality of pieces of third encryption information at the same time, and specifically, a formula for performing legality verification on a large amount of third encryption information can be as shown in the following formula (13):

$$e(\Pi Cipher(DID_k), g_2) = e(\Pi H_G(DID_k), PK') \quad \text{formula (13)}$$

where $Cipher(DID_k)$ characterizes third encryption information corresponding to a kth DID to be transmitted (i.e., a ciphertext identification corresponding to the DID to be transmitted); $H_G(DID_k)$ characterizes the hash values corresponding to the kth DID to be transmitted; and the description of other parameters in the formula (13) is the same as the detailed description of the corresponding parameters described above, and is not repeated here.

Here, when the formula (13) is established, it is characterized that the third encryption information corresponding to each DID to be transmitted is legal; when the formula (13) is not established, it is characterized that third encryption information corresponding to a certain DID to be transmitted is illegal, then correctness verification is required to be performed on the first encryption information fed back by each service participation end based on the bilinear mapping function, the public keys corresponding to each service participation end and the hash values corresponding to each DID to be transmitted, to determine the target service participation end with ciphertext fraud from the plurality of service participation ends; here, specifically, the step of determining the target service participation end with ciphertext fraud is the same as the step of performing correctness verification on the first encryption information fed back by each service participation end in accordance with the formula (12), which is not repeated here.

In a specific embodiment, after it is verified that the third encryption information is legal, the DID and the third encryption information (i.e., the ciphertext identification corresponding to the DID) can be stored in the encryption initiating end, to generate a table of correspondence between the DID and the ciphertext identification corresponding to the DID, i.e., $\{DID, Ciper(DID)\}$.

When the encryption initiating end is the first media end, specifically, a table of correspondence between the DID and the ciphertext identification corresponding to the DID can be as shown in Table 1 below:

TABLE 1

| media side <table of correspondence> | |
|---|---|
| DID | Ciper (DID) |
| DID1 | Ciper (DID1) |
| DID2 | Ciper (DID2) |
| ... | ... |
| DIDn | Ciper (DIDn) | where the table 1 shows that, when the encryption initiating end is the first media end, third encryption information respectively corresponding to a plurality of DIDs included in the first media end can be stored in the first media end; here, n represents the number of the DIDs included in the first media end.

When the encryption initiating end is the DSP, specifically, a table of correspondence between the DID and the ciphertext identification corresponding to the DID can be as shown in Table 2 below:

TABLE 2

| DSP side <table of correspondence> | | DSP side <bidding participation log> | |
|---|---|---|---|
| DID | Ciper (DID) | bid_cnt | show_cnt |
| DID1 | Ciper (DID1) | 2 | 1 |
| DID2 | Ciper (DID2) | 0 | 0 |
| ... | ... | ... | ... |
| DIDn | Ciper (DIDn) | 1 | 0 | where bid_cnt represents the number of historical bidding participations corresponding to the DID; show_cnt represents the number of historical bidding successes corresponding to the DID; Table 2 shows that, when the encryption initiating end is the DSP, third encryption information respectively corresponding to a plurality of DIDs included in the DSP, the number of historical bidding participations corresponding to each DID, and the number of historical bidding successes corresponding to each DID can be stored in the DSP; here, n represents the number of the DIDs included in the DSP.

In a specific implementation, the encryption initiating end can send a multimedia resource launch strategy request to a demand-side platform; wherein the multimedia resource launch strategy request comprises the ciphertext identification corresponding to the target information; receive a target multimedia resource launch strategy returned by the demand-side platform, the target multimedia resource launch strategy being a launch strategy determined by the demand-side platform based on the ciphertext identification corresponding to the target information; and perform multimedia resource launch in accordance with the target multimedia resource launch strategy.

For example, in a specific implementation, after a user logs on a first media end by using a target device, the first media end can acquire DID of the target device as target DID, and the first media end searches for a ciphertext identification corresponding to the target DID in accordance with a stored table of correspondence between the DID and the ciphertext identification of the DID (i.e., ⟨DID, Ciper (DID)⟩), and sends a multimedia resource launch strategy request including the ciphertext identification of the DID to a DSP, so that the DSP determines a corresponding bidding strategy based on the ciphertext identification of the target DID, and determines a target multimedia resource launch strategy based on ciphertext identification of the target DID after the bidding is successful; and the DSP sends the determined target multimedia resource launch strategy to the first media end, and the first media end can perform multimedia resource launch in accordance with the target multimedia resource launch strategy.

In a specific implementation, when there is a newly added media end participating in the encryption system as a new encryption participation end, the blinded information after the blinding processing based on the step S101 is sent to the newly added service participation end, so that the newly added service participation end, based on its own private key, performs encryption processing on the blinded information after the blinding processing to obtain encrypted first encryption information, and sends the first encryption information to the encryption initiating end; the encryption initiating end receives the encrypted first encryption information sent by the newly added service participation end, and based on this first encryption information, a public key corresponding to the newly added service participation end, and a target random number, updates a stored ciphertext identification of the target information to obtain the updated ciphertext identification of the target information.

Here, a private key of the newly added service participation end can be characterized by $\alpha_j$, and a public key on the group $G_1$ corresponding to the newly added service participation end is $PK_j = g_1^{\alpha_j}$, and a public key on the group $G_2$ is $PK'_j = g_2^{\alpha_j}$; here, the system public keys can be updated in accordance with the public keys of the newly added service participation end, to obtain the system public keys including the public keys of the newly added service participation end, thus an updated first system public key on the group $G_1$ corresponding to the plurality of service participation ends is $PK_{new} = PK \cdot PK_j$, and an updated second system public key on the group $G_2$ corresponding to the plurality of service participation ends is: $PK'_{new} = PK' \cdot PK'_j$.

Specifically, the newly added service participation end can, by using its own private key, perform encryption processing on the blinded information (i.e., M) (i.e., using M as a base number and using the private key $\alpha_j$ of each service participation end as a power exponent) to obtain encrypted first encryption information $c_j$; the newly added service participation end sends the encrypted first encryption information $c_j$ to the encryption initiating end, and the encryption initiating end, after receiving the first encryption information $c_j$ sent by the newly added service participation end, can update the stored ciphertext identification corresponding to the DID based on the first encryption information $c_j$, the public key $PK_j = g_1^{\alpha_j}$ on the group $G_1$ corresponding to the newly added service participation end, and the target random number $\beta$, in accordance with the following formula (14), to obtain an updated ciphertext identification Cipher(DID)$_{new}$.

Specifically, the formula (14) for updating the stored ciphertext identification corresponding to the DID based on the first encryption information $c_j$ is shown as follows:

$$\text{Cipher(DID)}_{new} = \text{Cipher(DID)} \cdot c_j \cdot PK_j^{-\beta} \qquad \text{formula (14)}$$

where Cipher(DID)$_{new}$ characterizes the updated ciphertext identification; Cipher(DID) characterizes the ciphertext identification corresponding to the DID after the legality verification being performed stored in the encryption initiating end; $c_j$ characterizes the first encryption information after encrypting the blinded information by the newly added service participation end; and $PK_j^{-\beta}$ characterizes a de-blinding coefficient corresponding to the newly added service participation end.

In a specific implementation, after the updated ciphertext identification is generated in accordance with the above formula (14), the table of correspondence between the DID and the ciphertext identification corresponding to the DID (i.e., ⟨DID, Ciper(DID)⟩) that is stored in the encryption initiating end can be updated based on the updated ciphertext identification.

In a specific implementation, when a service participation end exits the encryption system, legality verification is performed on a private key currently published by the exited service participation end based on the private key currently published by the exited service participation end and a pre-stored public key previously published by the exited service participation end; after the verification is passed, a ciphertext identification corresponding to the target information is updated based on the private key currently published by the exited service participation end and the hash values, to obtain the updated ciphertext identification.

The exited service participation end here can include an actively exited media end, or a kicked-out target service participation end; here, the target service participation end is the media end with ciphertext fraud determined in the above correctness verification process.

Here, the private key of the exited service participation end can be characterized by $\alpha_j$, and when the service participation end exits the encryption system, the private key of the exited service participation end will be published, so that other service participation ends can, in accordance with the private key $\alpha_j$ currently published by the exited service participation end and the public key $PK_j=g_1^{\alpha_j}$ on the group $G_1$ and the public key $PK'_j=g_2^{\alpha_j}$ on the group $G_2$ previously published by the exited service participation end, perform legality verification on the private key currently published by the exited service participation end.

When the other service participation ends can, in accordance with the private key $\alpha_j$ currently published by the exited service participation end, the generator $g_1$ corresponding to the multiplicative cyclic group $G_1$ and the generator $g_2$ corresponding to the multiplicative cyclic group $G_2$, obtain the public key $PK_j=g_1^{\alpha_j}$ on the group $G_1$ and the public key $PK'_j=g_2^{\alpha_j}$ on the group $G_2$ previously published by the exited service participation end, it is characterized that the private key currently published by the exited service participation end is legal.

After it is verified that the private key currently published by the exited service participation end is legal, the system public key can be updated in accordance with the public key of the exited service participation end, and the updated first system public key on the group $G_1$ corresponding to the plurality of media ends is: $PK_{new}=PK/PK_j=PK/g_1^{\alpha_j}$, and the updated second system public key on the group $G_2$ corresponding to the plurality of media ends is: $PK'_{new}=PK'/PK'_j=PK'/g_2^{\alpha_j}$.

After it is verified that the exited service participation end is legal, based on the private key $\alpha_j$ currently published by the exited service participation end and the hash values $H_G(DID)$ corresponding to DID to be encrypted, a stored ciphertext identification corresponding to the DID can be updated to obtain the updated ciphertext identification $Cipher(DID)_{new}$.

Specifically, a formula for updating the stored ciphertext identification corresponding to the DID based on the private key $\alpha_j$ currently published by the exited service participation end and the hash values $H_G(DID)$ corresponding to the DID to be transmitted is as shown in the following formula (15):

$$Cipher(DID)_{new}=Cipher(DID)/H_G(DID)^{\alpha_j} \quad \text{formula (15)}$$

where $Cipher(DID)_{new}$ characterizes the updated ciphertext identification; $Cipher(DID)$ characterizes a ciphertext identification corresponding to the DID after the legality verification being performed stored in the encryption initiating end; $H_G(DID)$ characterizes the hash values after the hash operation is performed on the DID to be transmitted; and $\alpha_j$ characterizes the private key currently published by the exited service participation end.

In a specific implementation, after the updated ciphertext identification is generated in accordance with the above formula (15), the table of correspondence between the DID and the ciphertext identification corresponding to the DID (i.e., ⟨DID, Ciper(DID)⟩) that is stored in the encryption initiating end can be updated based on the updated ciphertext identification.

Here, when the encryption initiating end is the DSP, and the table of correspondence between the DID and the ciphertext identification corresponding to the DID that is stored in the DSP is: ⟨blank, Ciper(DID)⟩ (that is, only the third encryption information is stored, and it is unknown what is the DID corresponding to the third encryption information), a media provision party for the ciphertext identification can be found, and the updated ciphertext identification is acquired from the media provision party; if the media provision party is the exited service participation end, ⟨blank, Ciper(DID)⟩ stored in the DSP is deleted.

An embodiment of the present disclosure further provides another data processing method applied to a service participation end, which comprises steps S201 to S203, in which:

S201, receiving blinded information after blinding processing that is sent by an encryption initiating end, wherein the encryption initiating end comprises a first media end or a demand-side platform (DSP).

The service participation end is an encryption participation party participating in encryption in this data processing method.

In a specific implementation, after the encryption initiating end performs blinding processing on target information to be transmitted based on the step S101 to obtain blinded information after the blinding processing, it sends the blinded information after the blinding processing to the service participation end based on the step S102; the service participation end receives the blinded information after the blinding processing that is sent by the encryption initiating end, and performs encryption processing on the received blinded information based on step S202, which is described in detail with reference to the step S202 below.

S202, performing encryption processing on the blinded information by using a private key of the service participation end to obtain encrypted first encryption information.

Here, a plurality of media ends including the service participation end are each provided with a corresponding private key and public key, and for the specific description of the private key and the public key, reference is made to the above step S102.

Here, an example that the target information to be transmitted is the DID is taken.

Specifically, after receiving the blinded information, the service participation end can, through its own private key $\alpha_i$, encrypt the blinded information (that is, using M as a base number and using a private key $\alpha_i$ of each first media end as a power exponent) to obtain encrypted first encryption information $c_i$.

Specifically, a formula for performing encryption processing on the blinded information by the service participation end can be as shown in the formula (2) in the above step S102, which is not repeated here.

In a specific implementation, the service participation end can, after performing encryption processing on the blinded information to obtain encrypted first encryption information, send the first encryption information to the encryption initiating end based on step S203, which is described specifically in the step S203 below.

S203, sending the first encryption information to the encryption initiating end.

In a specific implementation, the service participation end can, after performing encryption processing on the blinded information to obtain the encrypted first encryption information, send the first encryption information to the encryption initiating end, so that the encryption initiating end generates a ciphertext identification corresponding to the target information based on the steps S103 to S104, thereby implementing multiparty encryption.

Exemplarily, if the target information to be transmitted is DID, an encryption system includes 3 service participation ends (i.e., a media end 1, a media end 2, and a media end 3) participating in encryption, and a private key corresponding to the media end 1 is $\alpha_1$, a private key corresponding to the media end 2 is $\alpha_2$, and a private key corresponding to the media end 3 is $\alpha_3$; an encryption initiating end, after performing hash operation on the DID to be transmitted, and multiplying the operation result by a blinding coefficient corresponding to a target random number for blinding processing based on the step S101, obtains blinded information: $M=H_G(DID) \cdot g_1^\beta$; the encryption initiating end respectively sends the blinded information to the 3 service participation ends.

Each service participation end, after receiving the blinded information, performs encryption processing on the blinded information by using its own private key to obtain first encryption information $c_1=M^{\alpha_1}$ corresponding to the media end 1, first encryption information $c_2=M^{\alpha_2}$ corresponding to the media end 2, and first encryption information $c_3=M^{\alpha_3}$ corresponding to the media end 3, and each service participation end sends its own encrypted first encryption information to the encryption initiating end.

The encryption initiating end, after receiving the first encryption information sent by each service participation end, performs fusion on the acquired first encryption information by using the formula (4) or the formula (5) in the step S103 to obtain fused second encryption information; and performs de-blinding processing on the fused second encryption information based on the formula (9) or the formula (10) in the step S104 to obtain third encryption information, and uses the third encryption information as a ciphertext identification corresponding to the DID.

After obtaining the third encryption information, the encryption initiating end may perform legality verification on the third encryption information based on the formula (11) in the step S104, and when verifying that the third encryption information is legal, may store the third encryption information to generate a table $\big(DID, Ciper(DID)\big)$ of correspondence between the DID and the ciphertext identification corresponding to the DID.

Figure 2:
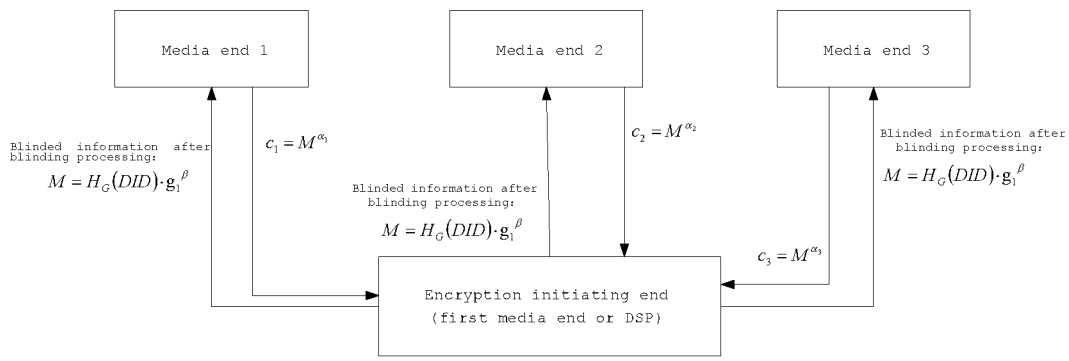
FIG. 2 shows a schematic diagram of an encryption flow provided by an embodiment of the present disclosure.

Here, a specific schematic diagram of an encryption flow is shown in FIG. 2, which includes the encryption initiating end: the first media end or DSP, the 3 service participation ends (the media end 1, the media end 2, the media end 3), a transmission process that the encryption initiating end sends the blinded information $M=H_G(DID) \cdot g_1^\beta$ after the blinding processing to the 3 service participation ends, and a transmission process that the 3 service participation ends respectively send corresponding first encryption information to the encryption initiating end.

The embodiment of the present disclosure further provides another data processing method, comprising steps S301 to S302, in which:

S301, for a target user device identity (DID) which needs bidding, acquiring a ciphertext identification corresponding to the target DID.

In a specific implementation, after a user logs on a media end by using a target electronic device, the media end acquires a target DID of the target electronic device, and can search a stored table of correspondence (such as Table 1) between the DID and the ciphertext identification corresponding to the DID for the target DID which needs bidding, to acquire a ciphertext identification corresponding to the target DID.

S302, sending the ciphertext identification to a demand-side platform (DSP), so that the DSP determines a bidding strategy based on the ciphertext identification.

In a specific implementation, the media end can, after acquiring the ciphertext identification corresponding to the target DID, send the ciphertext identification corresponding to the target DID to the DSP, so that the DSP determines a bidding strategy based on a stored table (such as Table 2) of correspondence between the DID and the ciphertext identification corresponding to the DID; here, a specific flow of the DSP determining the bidding strategy based on the third DID can be shown in steps S401 to S403 described below.

In the embodiment of the present disclosure, the media end can, after acquiring the target DID, send the ciphertext identification corresponding to the target DID to the DSP in accordance with the correspondence between the target DID and the ciphertext identification corresponding to the DID, so that leakage of the target DID in the transmission process is avoided, and security of the information transmission is improved.

The embodiment of the present disclosure further provides a flow diagram of another data processing method, wherein the method comprises steps S401 to S403, in which:

S401, receiving any ciphertext identification sent by a media end.

S402, based on the any ciphertext identification, searching a stored table of a mapping relation between the DID and the ciphertext identification corresponding to the DID for a target DID corresponding to the any ciphertext identification.

S403, generating a bidding strategy corresponding to the target DID based on found historical bidding data corresponding to the target DID.

The historical bidding data includes a user persona; and the user persona can include historical user behavior data, or user information obtained by learning the historical user behavior data through a machine learning technique.

In a specific implementation, if the any ciphertext identification is not found, it is determined that the bidding strategy corresponding to the target DID is a default bidding strategy; and if the any ciphertext identification is found but the target DID corresponding to the ciphertext identification is not found, the bidding strategy corresponding to the target DID is determined based on the stored historical bidding data corresponding to the any ciphertext identification.

Here, generally, when the ciphertext identification is stored in a DSP, regardless of whether a target DID corresponding to the ciphertext identification is stored in the DSP, historical bidding data corresponding to the ciphertext identification is stored; and therefore, after the ciphertext identification is received, if the ciphertext identification can be acquired from a table of correspondence between the DID and the ciphertext identification that is stored in the DSP, the historical bidding data corresponding to the ciphertext identification can be acquired.

Specifically, if the any ciphertext identification is not found in the stored table of the mapping relation between the DID and the ciphertext identification corresponding to the DID, it is determined that the bidding strategy corresponding to the target DID is a default bidding strategy, and the any ciphertext identification is stored; and after bidding is completed, a bidding participation log corresponding to the any ciphertext identification is generated and stored based on the bidding result; and if the any ciphertext identification is found in the stored table of the mapping relation between the DID and the ciphertext identification corresponding to the DID, but a target DID corresponding to the any ciphertext identification is not found; a bidding strategy corresponding to the target DID corresponding to the any ciphertext identification is generated based on the historical bidding data corresponding to the any ciphertext identification stored in the DSP; and after bidding is completed, a bidding participation log of the bidding this time corresponding to the any ciphertext identification is generated based on the bidding result, and the bidding participation log corresponding to the any ciphertext identification is updated based on the bidding log of the bidding this time.

Generally, after an electronic device identity (namely, a DID) of a user is acquired, historical bidding data corresponding to the DID can be acquired; the historical bidding data here can include a user persona; the user persona can include user historical behavior data, then analysis can be performed on the user historical behavior data in the user persona, and based on the analysis result, a bidding corresponding to the DID when participating in bidding is determined; when the bidding is successful, the DSP can push a customized advertisement for the user of the DID in accordance with the user historical behavior data in the user persona; wherein the user historical behavior data can include records for webpages historically browsed by the user, records for games historically experienced by the user, and behaviors of the user after historically viewing advertisements (which can, for example, include behaviors such as behaviors of downloading a game in a game advertisement and experiencing the game after the user views the advertisement, and behaviors of purchasing a commodity in a shopping advertisement after the user views the advertisement, etc.), or can include user information obtained by learning user historical behaviors through a machine learning technique.

Exemplarily, user historical behavior data includes purchasing a commodity in a shopping advertisement by a user after viewing the advertisement, but not downloading a game in a game advertisement by the user after viewing the advertisement; therefore, in accordance with the user historical behavior data, it can be determined that the user prefers shopping rather than playing games, so that when the DID of the user participates in bidding of a shopping advertisement, the DSP will give a higher bidding for the DID, and after the bidding is successful, will push shopping advertisements for the user, thereby giving a corresponding bidding in the advertisement launch bidding participation process based on the historical behavior data of the user, and accurately launching an advertisement matched with the user for the user after the bidding is successful, to achieve the accurate launch of the advertisement.

Therefore, the DSP receives the ciphertext identification sent in the above step S302, and after receiving the ciphertext identification, can search, based on the ciphertext identification, the stored table (for example, Table 2) of correspondence between the DID and the ciphertext identification corresponding to the DID for a target DID corresponding to the ciphertext identification, and after acquiring the target DID from the table of correspondence that is stored in the DSP, can acquire historical bidding data corresponding to the DID based on the DID, and in accordance with the historical bidding data, determine a value of the user corresponding to the DID, to generate a corresponding bidding strategy.

Here, if the user persona included in the history bidding data comprises: purchasing a commodity in a shopping advertisement by the user after viewing the advertisement, and also comprises user historical behavior data such as downloading a game in a game advertisement by the user after viewing the advertisement, it is characterized that an advertisement conversion value of the user is higher, then a value of the user is higher, and in an advertisement launch bidding process, the DSP will generate a higher bidding for the user to participate in the bidding for advertisement launch; conversely, when the user persona included in the historical bidding data comprises: not purchasing a commodity in a shopping advertisement by the user after viewing the advertisement, and also comprises historical behavior data of the user such as not downloading a game in a game advertisement by the user after viewing the advertisement, it is characterized that an advertisement conversion value of the user is lower, then a value of the user is lower, so that in the advertisement launch bidding process, the DSP will generate a lower bidding for the user to participate in the bidding for advertisement launch.

In a specific implementation, generally, the media end will send the ciphertext identification corresponding to the target DID to a plurality of DSPs, so that each DSP gives different biddings based on acquired different historical bidding data corresponding to the target DID, and a DSP that bids successfully can, in accordance with a user persona in the acquired historical bidding data, generate an advertisement launch strategy matched with the user persona, so as to accurately launch content interested by the user to the user, thereby further improving a conversion value of an advertisement.

Exemplarily, a user persona in historical bidding data acquired by a DSP that bids successfully comprises: records for 5 news webpages browsed by the user, and historical behavior data of downloading a game in a game advertisement by the user after viewing the advertisement, and experiencing the game; then the DSP can, in accordance with the above user persona, accurately launch an advertisement of a news application and an advertisement of a game application for the user, so as to accurately launch content interested by the user to the user, thereby further improving a conversion value of an advertisement.

In a possible implementation, if in a DSP, a ciphertext identification is stored but a target DID corresponding to the ciphertext identification is not stored, the correspondence between the DID and the ciphertext identification corresponding to the DID that is stored in the DSP is ⟨ blank, Ciper(DID)⟩, and after the ciphertext identification is received, stored historical bidding data corresponding to the ciphertext identification can be acquired in accordance with the ciphertext identification to generate a bidding strategy corresponding to the target DID corresponding to the ciphertext identification.

In a possible implementation, if a ciphertext identification is not stored in a DSP, and after the ciphertext identification is received, a target DID corresponding to the ciphertext identification is not found, it is characterized that the ciphertext identification corresponding to the target DID is not stored in the DSP (that is, the DSP receives the ciphertext identification corresponding to the target DID for the first time); the DSP here does not know which user's electronic device identification the target DID is, and here since the DSP receives the ciphertext identification corresponding to the target DID for the first time, historical bidding data corresponding to the target DID is also not stored in the DSP, so the DSP can only evaluate a value of the user in accordance with a preset default strategy to generate a corresponding bidding strategy for the user.

Here, when it is determined that the ciphertext identification corresponding to the target DID is not stored in the DSP, after the ciphertext identification corresponding to the target DID that is sent by a second media end is received, because the ciphertext identification sent by the second media end is, based on the steps S101 to S104 and the steps S201 to S203, generated by performing multiparty encryption so that the DSP cannot decrypt the target DID corresponding to the ciphertext identification based on the acquired ciphertext identification, ⟨ blank, Ciper(DID)⟩ may be taken as a table of correspondence between the target DID and the ciphertext identification corresponding to the target DID and stored in the DSP.

In a specific implementation, after the bidding is completed, the DSP can generate a corresponding bidding participation log in accordance with the bidding result, and store the bidding participation log.

Exemplarily, if a user uses an electronic device with an identity of $DID_{n+1}$, to log on a media end and the media end has therein stored a table of correspondence between $DID_{n+1}$, and a ciphertext identification $Ciper(DID_{n+1})$, after the user logs on the media end, the ciphertext identification $Ciper(DID_{n+1})$ corresponding the $DID_{n+1}$, can be acquired and sent to a plurality of DSPs (which can include, for example, DSP1, DSP2, and DSP3); if the ciphertext identification $Ciper(DID_{n+1})$ corresponding to the $DID_{n+1}$, is not stored in the DSP3, the DSP3 can store the ciphertext identification $Ciper(DID_{n+1})$ after receiving the ciphertext identification $Ciper(DID_{n+1})$, thereby generating a table ⟨ blank, Ciper(DID)⟩ of correspondence between the DID and the ciphertext identification; however, the DSP1 and the DSP2 DSP2 both have therein stored a table ⟨ $DID_{n+1}$, $Ciper(DID_{n+1})$⟩ of correspondence between the $DID_{n+1}$, and the ciphertext identification $Ciper(DID_{n+1})$, so that the DSP1 and the DSP2 can, in accordance with an acquired user persona in historical bidding data corresponding to the target DID, determine a value of the user to give a bidding corresponding to the user; if the DSP1 gives the bidding of 50, the DSP2 gives the bidding of 80, and the DSP3 can evaluate the value of the user in accordance with a preset default strategy, and generate, for the user, a corresponding bidding of 90; a DSP that gives the highest bidding bids successfully (namely the DSP3 bids successfully), and the DSP3 that bids successfully can launch an advertisement for the user in accordance with a preset advertisement launch strategy; and here, after the bidding is completed, each DSP needs to update the stored bidding log in accordance with the corresponding bidding result.

If the table of correspondence between the DID and the ciphertext identification corresponding to the DID that is stored in the DSP3 is shown in Table 2, after the bidding this time is completed, the updated table of correspondence between the DID and the ciphertext identification corresponding to the DID can be shown in Table 3:

TABLE 3

| DSP side<table of correspondence> | | DSP side<bidding participation log> | |
|---|---|---|---|
| DID | Ciper (DID) | bid_cnt | show_cnt |
| DID1 | Ciper (DID1) | 2 | 1 |
| DID2 | Ciper (DID2) | 0 | 0 |
| ... | ... | ... | ... |
| DIDn | Ciper (DIDn) | 1 | 0 |
| blank | $Ciper(DID_{n+1})$ | 1 | 1 |

Exemplarily, if a user uses an electronic device with an identity of $DID_{n+1}$, to log on a media end and the media end has therein stored a table of correspondence between the $DID_{n+1}$ and a ciphertext identification $Ciper(D/D_{n+1})$, after the user logs on the media end, the ciphertext identification $Ciper(DID_{n+1})$ corresponding to the $DID_{n+1}$ can be acquired and sent to a plurality of DSPs (which can include, for example, DSP1, DSP2, and DSP3); if in the DSP3, the ciphertext identification $Ciper(DID_{n+1})$ corresponding to the $DID_{n+1}$ is stored but the $DID_{n+1}$ is not stored, that is: the table of correspondence between the $DID_{n+1}$ and the ciphertext identification $Ciper(D/D_{n+1})$ that is stored in the DSP3 is ⟨ blank, Ciper(DID)⟩ ; however, the DSP1 and the DSP2 both have therein stored a table ⟨ $DID_{n+1}$, $Ciper(DID_{n+1})$⟩ of correspondence between the $DID_{n+1}$ and the ciphertext identification $Ciper(DID_{n+1})$; the DSP1 and the DSP2 can, after acquiring the ciphertext identification corresponding to the $DID_{n+1}$, determine a value of the user in accordance with a user persona in stored historical bidding data corresponding to the $DID_{n+1}$, and give a bidding corresponding to the user; if the DSP1 gives the bidding of 50, the DSP2 gives the bidding of 80, the DSP3 can evaluate the value of the user in accordance with a user persona in stored historical bidding data corresponding to the ciphertext identification $Ciper(D/D_{n+1})$, and generate, for the user, a corresponding bidding of 90; a DSP that gives the highest bidding bids successfully (namely the DSP3 bids successfully), so that the DSP3 that bids successfully can accurately launch an advertisement interested by the user and matched with the user persona to the user in accordance with the user persona in the stored historical bidding data corresponding to the ciphertext identification $Ciper(DID_{n+1})$; here, after the bidding is completed, each DSP needs to update the stored bidding log in accordance with the bidding result corresponding to the bidding this time.

If the number of historical bidding participations corresponding to the cipher text identification $Ciper(DID_{n+1})$ that is stored in the DSP3 is 2 and the number of historical bidding successes is 1, after the bidding this time is completed, the number of historical bidding participations corresponding to the ciphertext identification $Ciper(DID_{n+1})$ that is stored in the DSP3 will be updated from the original 2 to 3, and the number of historical bidding successes is updated from the original 1 to 2.

Here, since the DSP1 did not bid successfully for the bidding this time, if the number of historical bidding participations corresponding to the $DID_{n+1}$ that is stored in the DSP1 is 3 and the number of historical bidding successes is 1, after the bidding this time is completed, the number of historical bidding participations corresponding to the $DID_{n+1}$ that is stored in the DSP1 will be updated from the original 3 to 4, and the number of historical bidding successes is not changed.

In the embodiment of the present disclosure, the ciphertext identification received by the DSP is an identification corresponding to ciphertext generated through multiparty encryption, which has high security, and the DSP cannot decrypt the ciphertext identification to obtain the target DID corresponding to the ciphertext identification, which avoids leakage of the target DID in the transmission process and improves security of information transmission.

It should be understood by those skilled in the art that in the specific implementations of the above method, the drafting order of the steps does not imply a strict order of execution to impose any limitation on the implementation process, and the specific execution order of the steps should be determined by their functions and possibly inherent logic.

Based on the same inventive concept, a data processing apparatus corresponding to the data processing method is further provided in an embodiment of the present disclosure, and since the principle of solving the problem by the apparatus in the embodiment of the present disclosure is similar to the above data processing method in the embodiment of the present disclosure, for the implementation of the apparatus, reference can be made to the implementation of the method, and repetitions will be not repeated.

Figure 3:
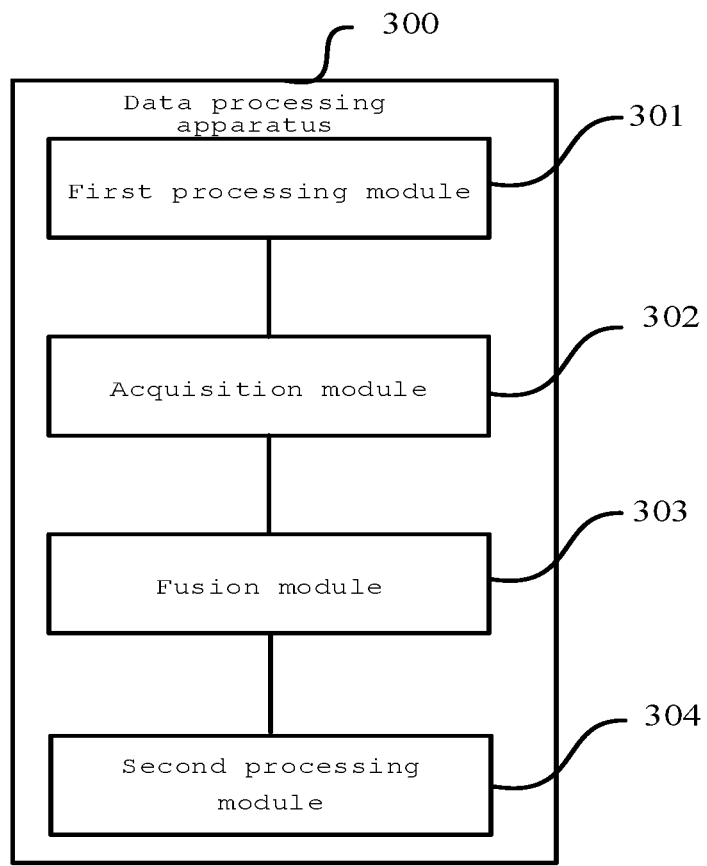
FIG. 3 shows a schematic diagram of a data processing apparatus provided by an embodiment of the present disclosure.

Referring to FIG. 3, a schematic diagram of a data processing apparatus 300 provided by an embodiment of the present disclosure is shown, the apparatus comprising: a first processing module 301, an acquisition module 302, a fusion module 303 and a second processing module 304, wherein the first processing module 301 is configured to perform blinding processing on target information to be transmitted to obtain blinded information.

The acquisition module 302 is configured to acquire a plurality of pieces of first encryption information obtained by performing encryption processing on the blinded information by a plurality of service participation ends.

The fusion module 303 is configured to perform data fusion on the plurality of pieces of first encryption information to obtain second encryption information.

The second processing module 304 is configured to perform de-blinding processing on the second encryption information to obtain third encryption information as a ciphertext identification corresponding to the target information, wherein the ciphertext identification corresponding to the target information is used for replacing the target information to be used in a service in which the plurality of service participation end jointly participates.

In an optional implementation, the first processing module 301 is specifically configured to perform hash processing on the target information to be transmitted to obtain hash values; select a target random number and perform blinding processing on the hash values based on a blinding coefficient corresponding to the target random number to obtain the blinded information;
and correspondingly, the second processing module 304 is specifically configured to determine a de-blinding coefficient corresponding to the target random number, and perform de-blinding processing on the second encryption information in accordance with the de-blinding coefficient to obtain the third encryption information.

In an optional implementation, the fusion module 303 is specifically configured to perform a multiplication operation on the plurality of pieces of first encryption information, and use a result of the multiplication operation as the second encryption information; or, perform a division operation on the plurality of pieces of first encryption information to obtain a result, and use the result of the division operation as the second encryption information.

In an optional implementation, the apparatus further comprises: a verification module configured to perform legality verification on the third encryption information, the legality verification being used for verifying whether there is illegal first encryption information in the plurality of pieces of first encryption information provided by the plurality of service participation end;
when the third encryption information does not satisfy legality, determine an illegal target service participation end from the plurality of service participation ends;
perform data re-fusion based on first encryption information generated by other service participation end than the target service participation end to generate second encryption information, and update the ciphertext identification corresponding to the target information based on re-synthesized second encryption information; or, send a ciphertext correction instruction to the target service participation end, acquire updated first encryption information returned by the target service participation end in response to the ciphertext correction instruction, and update the ciphertext identification corresponding to the target information based on the updated first encryption information.

In an optional implementation, the apparatus further comprises: a third processing module configured to send a multimedia resource launch strategy request to a demand-side platform, the multimedia resource launch strategy request comprising the ciphertext identification corresponding to the target information;
receive a target multimedia resource launch strategy returned by the demand-side platform, the target multimedia resource launch strategy being determined by the demand-side platform based on the ciphertext identification corresponding to the target information;
perform multimedia resource launch in accordance with the target multimedia resource launch strategy.

In an optional implementation, the apparatus further comprises: a fourth processing module configured to send, when there is a newly added service participation end, the target information to the newly added service participation end, and update the ciphertext identification corresponding to the target information in accordance with first encryption information returned by the newly added service participation end.

In an optional implementation, the apparatus further comprises: a fifth processing module configured to perform, when there is a service participation end applying for exit, identity legality verification on the service participation end applying for exit, and when legality is verified, update the ciphertext identification corresponding to the target information based on a private key provided by the service participation end applying for exit.

In the embodiments of the present disclosure, the target information is blinded and then sent to the plurality of service participation ends for encryption, and the final ciphertext identification corresponding to the target information is a fusion result of joint encryption by the plurality of service participation ends, so that security of the ciphertext identification is improved; in an advertisement launch service, the above service participation end can be a media end, which can be understood as a servicing end (client and/or server) provided by the media platform; the data processing method provided by this application can be applied to the media end and a demand-side platform participating in advertisement launch; with the above solution, in an advertisement launch system in which a plurality of media ends and a demand-side platform participate, the DID is subjected to blinding processing first, then a final DID ciphertext identification is generated based on joint participation in encryption by the plurality of media ends, and in a final advertisement launch application, by using the DID ciphertext identification in place of the DID plaintext for transmission, the DSP completes a decision of an advertisement launch strategy based on the DID ciphertext identification, so that plaintext leakage of the confidential DID can be avoided, and security of the confidential data is improved while the normal service is guaranteed.

For the description of processing flows of the modules in the apparatus and interaction flows between the modules, reference can be made to the relevant description in the above method embodiments, which will not be described in detail here.

Figure 4:
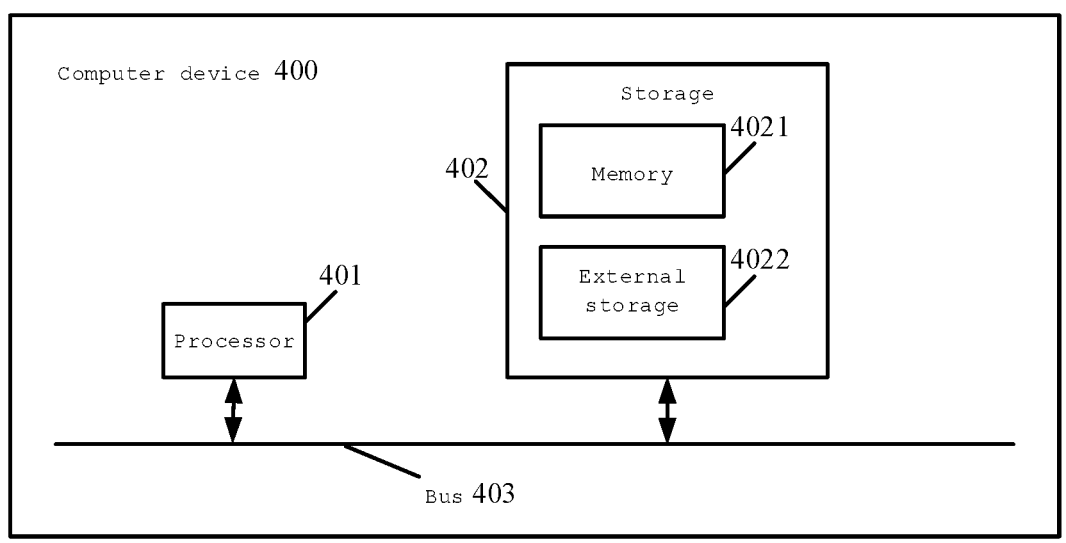
FIG. 4 shows a schematic diagram of a computer device provided by an embodiment of the present disclosure.

Based on the same technical concept, an embodiment of the present application further provides a computer device. Referring to FIG. 4, a schematic structural diagram of a computer device 400 provided in the embodiment of the present application is shown, where the computer device 400 comprises a processor 401, a storage 402, and a bus 403. The storage 402, which is used for storing executable instructions, includes a memory 4021 and an external storage 4022, wherein the memory 4021 is also referred to as an internal storage, and is used for temporarily storing operation data in the processor 401 and data exchanged with the external storage 4022 such as a hard disk, and the processor 401 exchanges data with the external storage 4022 through the memory 4021, and when the computer device 400 operates, the processor 401 and the storage 402 communicate with each other through the bus 403, so that the processor 401 executes the following instructions:

performing blinding processing on target information to be transmitted to obtain blinded information;

acquiring a plurality of pieces of first encryption information obtained by respectively performing encryption processing on the blinded information by a plurality of service participation ends;

performing data fusion on the plurality of pieces of first encryption information to obtain second encryption information;

performing de-blinding processing on the second encryption information to obtain third encryption information as a ciphertext identification corresponding to the target information, wherein the ciphertext identification corresponding to the target information is used for replacing the target information to be used in a service in which the plurality of service participation ends jointly participate.

Here, for the specific processing flow of the processor 401, reference can be made to the description of the above method embodiment, which is not repeated here.

An embodiment of the present disclosure further provides a non-transitory computer-readable storage medium having stored thereon a computer program which, when executed by a processor, performs the steps of the data processing method described in the above method embodiments. The storage medium can be a volatile or non-volatile computer-readable storage medium.

An embodiment of the present disclosure further provides a computer program, which when executed by a processor, performs the steps of the data processing method in the above method embodiments. The computer program can be, for example, a software application.

In the embodiments of the present disclosure, the computer program for performing the operations of the present disclosure can be written in one or more programming languages or the combination thereof, wherein the programming language includes but is not limited to an object-oriented programming language such as Java, Smalltalk, C++, and further comprises a conventional procedural programming language such as the "C" programming language or similar programming languages. The computer program can be executed entirely on a user's computer, partly on the user's computer, as a stand-alone software package, partly on the user's computer and partly on a remote computer, or entirely on the remote computer or server. In a scenario in which a remote computer is involved, the remote computer can be connected to the user's computer through any type of network, including a local area network (LAN) or a wide area network (WAN). An embodiment of the present disclosure further provides a computer program product, wherein the computer program product has thereon carried program code, and instructions included in the program code can be used for executing the steps of the data processing method in the foregoing method embodiments. For the specific description, reference can be made to the foregoing method embodiments, which are not repeated herein.

The computer program product can be specifically implemented by hardware, software or a combination thereof. In one optional implementation, the computer program product is specifically embodied as a computer storage medium, and in another optional implementation, the computer program product is specifically embodied as a software product, such as a software development kit (SDK) or the like.

It can be clearly understood by those skilled in the art that, for convenience and simplicity of the description, for the specific working process of the system and the apparatus described above, reference can be made to the corresponding process in the foregoing method embodiments, which is not repeated here. In the several embodiments provided in the present disclosure, it should be understood that the disclosed system, apparatus and method can be implemented in other ways. The apparatus embodiments described above are merely illustrative, for example, the division of the units is merely a logical function division, which can be divided in other ways in actual implementation, and for another example, a plurality of units or components can be combined or integrated into another system, or some features can be omitted, or not executed. In addition, the shown or discussed coupling or direct coupling or communication connection between each other can be indirect coupling or communication connection through some communication interfaces, devices or units, which can be in electrical, mechanical or other forms.

The units described as separate components may or may not be physically separate, and the components displayed as the units may or may not be physical units, that is, the units can be located in one position, or can be distributed onto a plurality of network units. Some or all of the units can be selected in accordance with actual needs to achieve the purpose of the solution of the embodiment.

In addition, the function units in the embodiments of the present disclosure can be integrated into one processing unit, or each unit can exist alone physically, or two or more units are integrated into one unit.

The function, if implemented in a software function unit and sold or used as a stand-alone product, can be stored in one non-transitory computer-readable storage medium that can be executed by a processor. Based on such understanding, the technical solution of the present disclosure in essence, or its part contributing to the prior art, or a part of the technical solution, can be embodied in a form of a software product, which is stored in one storage medium including several instructions for causing one computer device (which can be a personal computer, a server, a network device, or the like) to execute all or part of the steps of the method described in the embodiments of the present disclosure. The aforementioned storage medium comprises: various media capable of storing program code, such as a USB flash disk, a potable hard disk, a read-merely memory (ROM), a random access memory (RAM), a magnetic disk, or an optical disk.

Finally, it should be noted that: the embodiments described above are merely specific embodiments of the present disclosure, for illustrating the technical solutions of the present disclosure, rather than limiting the technical solutions, and the scope of the present disclosure is not limited thereto; although the present disclosure is described in detail with reference to the foregoing embodiments, those of ordinary skill in the art should understand that: anyone skilled in the art can still make modifications or readily conceive of changes to the embodiments recited in the foregoing embodiments, or make equivalent substitutions for some of the technical features, within the disclosed technical scope in the present disclosure; and these modifications, changes and substitutions, which do not make the essence of the corresponding technical solution depart from the spirit and scope of the technical solutions of the embodiments of the present disclosure, should be covered within the protection scope of the present disclosure. Therefore, the protection scope of the present disclosure shall be subject to the claimed protection scope.

What is claimed is:

1. A data processing method, comprising:
performing blinding processing on target information to be transmitted to obtain blinded information;
acquiring a plurality of pieces of first encryption information obtained by respectively performing encryption processing on the blinded information by a plurality of service participation ends;
performing data fusion on the plurality of pieces of first encryption information to obtain second encryption information;
performing de-blinding processing on the second encryption information to obtain third encryption information as a ciphertext identification corresponding to the target information, wherein the ciphertext identification corresponding to the target information is used for replacing the target information to be used in a service in which the plurality of service participation ends jointly participate.

2. The method according to claim 1, wherein the performing blinding processing on target information to be transmitted to obtain blinded information comprises:
performing hash processing on the target information to be transmitted to obtain hash values;
selecting a target random number, and performing blinding processing on the hash values based on a blinding coefficient corresponding to the target random number to obtain the blinded information;
and correspondingly, the performing de-blinding processing on the second encryption information to obtain third encryption information comprises:
determining a de-blinding coefficient corresponding to the target random number, and performing de-blinding processing on the second encryption information in accordance with the de-blinding coefficient to obtain the third encryption information.

3. The method according to claim 1, wherein the performing data fusion on the plurality of pieces of first encryption information to obtain second encryption information comprises:

performing a multiplication operation on the plurality of pieces of first encryption information, and using a result of the multiplication operation as the second encryption information; or,
performing a division operation on the plurality of pieces of first encryption information to obtain a result, and using the result of the division operation as the second encryption information.

4. The method according to claim 1, further comprising:
performing legality verification on the third encryption information, wherein the legality verification is used for verifying whether there is illegal first encryption information in the plurality of pieces of first encryption information provided by the plurality of service participation ends;
when the third encryption information does not satisfy legality, determining an illegal target service participation end from the plurality of service participation ends;
performing data re-fusion based on first encryption information generated by other service participation ends than the target service participation end to generate second encryption information, and updating the ciphertext identification corresponding to the target information based on re-synthesized second encryption information; or, sending a ciphertext correction instruction to the target service participation end, acquiring updated first encryption information returned by the target service participation end in response to the ciphertext correction instruction, and updating the ciphertext identification corresponding to the target information based on the updated first encryption information.

5. The method according to claim 1, further comprising:
sending a multimedia resource launch strategy request to a demand-side platform, the multimedia resource launch strategy request comprising the ciphertext identification corresponding to the target information;
receiving a target multimedia resource launch strategy returned by the demand-side platform, the target multimedia resource launch strategy being a launch strategy determined by the demand-side platform based on the ciphertext identification corresponding to the target information;
performing multimedia resource launch in accordance with the target multimedia resource launch strategy.

6. The method according to claim 1, further comprising:
when there is a newly added service participation end, sending the target information to the newly added service participation end, and updating the ciphertext identification corresponding to the target information in accordance with first encryption information returned by the newly added service participation end.

7. The method according to claim 1, further comprising:
when there is a service participation end applying for exit, performing identity legality verification on the service participation end applying for exit, and when legality is verified, updating the ciphertext identification corresponding to the target information based on a private key provided by the service participation end applying for exit.

8. A computer device, comprising a processor and a storage, the storage having stored thereon machine-readable instructions executable by the processor, the processor being configured to execute the machine-readable instructions stored in the storage which, when executed by the processor, implement the following data processing operations:

performing blinding processing on target information to be transmitted to obtain blinded information;
acquiring a plurality of pieces of first encryption information obtained by respectively performing encryption processing on the blinded information by a plurality of service participation ends;
performing data fusion on the plurality of pieces of first encryption information to obtain second encryption information;
performing de-blinding processing on the second encryption information to obtain third encryption information as a ciphertext identification corresponding to the target information, wherein the ciphertext identification corresponding to the target information is used for replacing the target information to be used in a service in which the plurality of service participation ends jointly participate.

9. The computer device according to claim 8, wherein the performing blinding processing on target information to be transmitted to obtain blinded information comprises:
performing hash processing on the target information to be transmitted to obtain hash values;
selecting a target random number, and performing blinding processing on the hash values based on a blinding coefficient corresponding to the target random number to obtain the blinded information;
and correspondingly, the performing de-blinding processing on the second encryption information to obtain third encryption information comprises:
determining a de-blinding coefficient corresponding to the target random number, and performing de-blinding processing on the second encryption information in accordance with the de-blinding coefficient to obtain the third encryption information.

10. The computer device according to claim 8, wherein the performing data fusion on the plurality of pieces of first encryption information to obtain second encryption information comprises:
performing a multiplication operation on the plurality of pieces of first encryption information, and using a result of the multiplication operation as the second encryption information; or,
performing a division operation on the plurality of pieces of first encryption information to obtain a result, and using the result of the division operation as the second encryption information.

11. The computer device according to claim 8, wherein the machine-readable instructions stored in the storage, when executed by the processor, further implement the following data processing operations:
performing legality verification on the third encryption information, wherein the legality verification is used for verifying whether there is illegal first encryption information in the plurality of pieces of first encryption information provided by the plurality of service participation ends;
when the third encryption information does not satisfy legality, determining an illegal target service participation end from the plurality of service participation ends;
performing data re-fusion based on first encryption information generated by other service participation ends than the target service participation end to generate second encryption information, and updating the ciphertext identification corresponding to the target information based on the re-synthesized second encryption information; or, sending a ciphertext correction instruction to the target service participation end, acquiring updated first encryption information returned by the target service participation end in response to the ciphertext correction instruction, and updating the ciphertext identification corresponding to the target information based on the updated first encryption information.

12. The computer device according to claim 8, wherein the machine-readable instructions stored in the storage, when executed by the processor, further implement the following data processing operations:
sending a multimedia resource launch strategy request to a demand-side platform, the multimedia resource launch strategy request comprising the ciphertext identification corresponding to the target information;
receiving a target multimedia resource launch strategy returned by the demand-side platform, the target multimedia resource launch strategy being a launch strategy determined by the demand-side platform based on the ciphertext identification corresponding to the target information;
performing multimedia resource launch in accordance with the target multimedia resource launch strategy.

13. The computer device according to claim 8, wherein the machine-readable instructions stored in the storage, when executed by the processor, further implement the following data processing operation:
when there is a newly added service participation end, sending the target information to the newly added service participation end, and updating the ciphertext identification corresponding to the target information in accordance with first encryption information returned by the newly added service participation end.

14. The computer device according to claim 8, wherein the machine-readable instructions stored in the storage, when executed by the processor, further implement the following data processing operation:
when there is a service participation end applying for exit, performing identity legality verification on the service participation end applying for exit, and when legality is verified, updating the ciphertext identification corresponding to the target information based on a private key provided by the service participation end applying for exit.

15. A non-transitory computer-readable storage medium having stored thereon a computer program which, when executed by a computer device, implements the following data processing operations:
performing blinding processing on target information to be transmitted to obtain blinded information;
acquiring a plurality of pieces of first encryption information obtained by respectively performing encryption processing on the blinded information by a plurality of service participation ends;
performing data fusion on the plurality of pieces of first encryption information to obtain second encryption information;
performing de-blinding processing on the second encryption information to obtain third encryption information as a ciphertext identification corresponding to the target information, wherein the ciphertext identification corresponding to the target information is used for replacing the target information to be used in a service in which the plurality of service participation ends jointly participate.

16. The non-transitory computer-readable storage medium according to claim 15, wherein the performing blinding processing on target information to be transmitted to obtain blinded information comprises:
  performing hash processing on the target information to be transmitted to obtain hash values;
  selecting a target random number, and performing blinding processing on the hash values based on a blinding coefficient corresponding to the target random number to obtain the blinded information;
  and correspondingly, the performing de-blinding processing on the second encryption information to obtain third encryption information comprises:
  determining a de-blinding coefficient corresponding to the target random number, and performing de-blinding processing on the second encryption information in accordance with the de-blinding coefficient to obtain the third encryption information.

17. The non-transitory computer-readable storage medium according to claim 15, wherein the performing data fusion on the plurality of pieces of first encryption information to obtain second encryption information comprises:
  performing a multiplication operation on the plurality of pieces of first encryption information, and using a result of the multiplication operation as the second encryption information; or,
  performing a division operation on the plurality of pieces of first encryption information to obtain a result, and using the result of the division operation as the second encryption information.

18. The non-transitory computer-readable storage medium according to claim 15, wherein the computer program, when executed by the computer device, further implements the following data processing operations:
  performing legality verification on the third encryption information, wherein the legality verification is used for verifying whether there is illegal first encryption information in the plurality of pieces of first encryption information provided by the plurality of service participation ends;
  when the third encryption information does not satisfy legality, determining an illegal target service participation end from the plurality of service participation ends;
  performing data re-fusion based on first encryption information generated by other service participation ends than the target service participation end to generate second encryption information, and updating the ciphertext identification corresponding to the target information based on the re-synthesized second encryption information; or, sending a ciphertext correction instruction to the target service participation end, acquiring updated first encryption information returned by the target service participation end in response to the ciphertext correction instruction, and updating the ciphertext identification corresponding to the target information based on the updated first encryption information.

19. The non-transitory computer-readable storage medium according to claim 15, wherein the computer program, when executed by the computer device, further implements the following data processing operations:
  sending a multimedia resource launch strategy request to a demand-side platform, the multimedia resource launch strategy request comprising the ciphertext identification corresponding to the target information;
  receiving a target multimedia resource launch strategy returned by the demand-side platform, the target multimedia resource launch strategy being a launch strategy determined by the demand-side platform based on the ciphertext identification corresponding to the target information;
  performing multimedia resource launch in accordance with the target multimedia resource launch strategy.

20. The non-transitory computer-readable storage medium according to claim 15, wherein the computer program, when executed by the computer device, further implements the following data processing operation:
  when there is a newly added service participation end, sending the target information to the newly added service participation end, and updating the ciphertext identification corresponding to the target information in accordance with first encryption information returned by the newly added service participation end.

* * * * *